United States Patent
Albrecht et al.

(10) Patent No.: US 10,855,626 B2
(45) Date of Patent: Dec. 1, 2020

(54) TRANSCRIPTION BOT FOR GROUP COMMUNICATIONS

(71) Applicant: Orion Labs, San Francisco, CA (US)

(72) Inventors: Gregory Albrecht, San Francisco, CA (US); Ellen Juhlin, San Francisco, CA (US); Jesse Robbins, San Francisco, CA (US)

(73) Assignee: Orion Labs, Inc., San Francisco, CA (US)

(*) Notice: Subject to any disclaimer, the term of this patent is extended or adjusted under 35 U.S.C. 154(b) by 29 days.

(21) Appl. No.: 16/149,692

(22) Filed: Oct. 2, 2018

(65) Prior Publication Data

US 2019/0104094 A1 Apr. 4, 2019

Related U.S. Application Data

(60) Provisional application No. 62/567,338, filed on Oct. 3, 2017.

(51) Int. Cl.

| | |
|---|---|
| *G06F 15/16* | (2006.01) |
| *H04L 12/58* | (2006.01) |
| *H04L 29/08* | (2006.01) |
| *G10L 15/26* | (2006.01) |
| *G10L 15/22* | (2006.01) |
| *H04W 4/08* | (2009.01) |

(52) U.S. Cl.
CPC .............. *H04L 51/02* (2013.01); *G10L 15/22* (2013.01); *G10L 15/26* (2013.01); *G10L 15/265* (2013.01); *H04L 51/10* (2013.01); *H04L 51/18* (2013.01); *H04L 67/1044* (2013.01); *H04W 4/08* (2013.01); *G10L 2015/223* (2013.01)

(58) Field of Classification Search
CPC ......... H04L 51/02; G10L 15/22; G10L 15/26; G10L 15/265
See application file for complete search history.

(56) References Cited

U.S. PATENT DOCUMENTS

| | | | |
|---|---|---|---|
| 2008/0181140 A1* | 7/2008 | Bangor | H04L 12/1818 370/261 |
| 2015/0249747 A1* | 9/2015 | Boss | H04M 3/565 379/85 |
| 2018/0191907 A1* | 7/2018 | Herrin | G10L 15/26 |
| 2018/0203442 A1* | 7/2018 | Kotlyarov | G08B 13/1966 |
| 2018/0278555 A1* | 9/2018 | Robbins | H04L 61/2069 |
| 2018/0278556 A1* | 9/2018 | Robbins | H04L 51/02 |
| 2018/0278557 A1* | 9/2018 | Robbins | H04L 51/04 |
| 2018/0309805 A1* | 10/2018 | Robbins | H01L 21/823418 |

* cited by examiner

Primary Examiner — Douglas B Blair

(57) ABSTRACT

A group communication service receives user node communications from and distributes user node communications to members of a communication group. The communication group members comprise a plurality of user nodes. The group communication service then receives an audio transcription request from one or more of the plurality of user nodes. In response to receiving the request, group communication service launches a bot node member of the communication group configured to deliver transcribed content messages to one or more destination services. The group communication system then receives an audio content message from one or more of the plurality of user nodes and delivers a transcribed content message of the audio content message to the one or more destination services over the bot node member of the communication group.

19 Claims, 7 Drawing Sheets

TRANSCRIPTION BOT FOR GROUP COMMUNICATIONS

TECHNICAL BACKGROUND

Group management systems facilitate secure communications between multiple user nodes in a distributed communication environment. Communications among members of a defined group can be enabled using distributed end user devices operating in the networked user nodes, where multiple user nodes each include an intermediate communication device that establishes a communication channel with another intermediate communication device in another user node. The intermediate communication devices (e.g., cellphones, smartphones, laptop computers, tablets and others) are linked to a communication network and the group management system, which implements communications between user devices (via a communication application in each intermediate communication device) in the defined group of user nodes.

Publishing content on media services has become commonplace. A user communicating with members of a group may be interested in distributing audio communications to additional end users in the form of written communication. For instance, employees who are members of a communication group may want to post comments or document events in a digital workspace environment where the audio recordings from the members are published in group collaboration applications.

While users may publish context using various destination service applications, members of a group communicating using a recorded audio message are unable to directly communicate with the destination services without the need of using an additional service to perform the audio recording transcription and create the text document. Furthermore, an identity of a group member would not be directly correlated with an identity used for publishing in a destination service. A variety of solutions have been tried with respect to simplifying the delivery of an audio transcription to a destination service. However, current solutions do not allow users to directly publish audio content to destination services when the audio content is received from a user node associated with a group in a group communication service.

SUMMARY

Technology is disclosed herein that improves audio message transcription to destination services. In various implementations, a group communication system receives user node communications from and distributes user node communications to members of a communication group, wherein the communication group members comprise a plurality of user nodes. The group communication system receives an audio transcription request from one or more of the plurality of user nodes and launches a bot node member of the communication group configured to deliver transcribed content messages to one or more destination services. An audio content message is then received from one or more of the plurality of user nodes and a transcribed content message of the audio content message is delivered to the one or more destination services over the bot node member of the communication group.

In some implementations, for the audio content message to be converted to the transcribed content message, the group communication service is paired with a transcription service to perform the conversion. The transcribed content message is then sent to a bot node member. In other cases, the audio content message is sent to the bot node member for transcription. In either case, the bot node member delivers the transcribed content message to the destination services for publication on behalf of the user node and/or communication group.

In still other implementations, the group communication service receives a transcribed content message from the one or more destination services over the bot node member of the communication group. The group communication service then delivers an audio content message of the transcribed content message to the one or more of the plurality of user nodes in the communication group.

In some implementations, the group communication service determines an Internet Protocol (IP) address associated with the bot node member based on an IP address associated with the user node member. In this implementation, the transcribed content message is delivered to the one or more destination services using an IP address associated with the bot node member.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Technology is disclosed herein that enhances audio message transcription to destination services by launching a bot node to deliver a transcribed audio message to the destination services, so that a recorded audio message from a user node can be published on the destination services in the transcription process.

Figure 1:
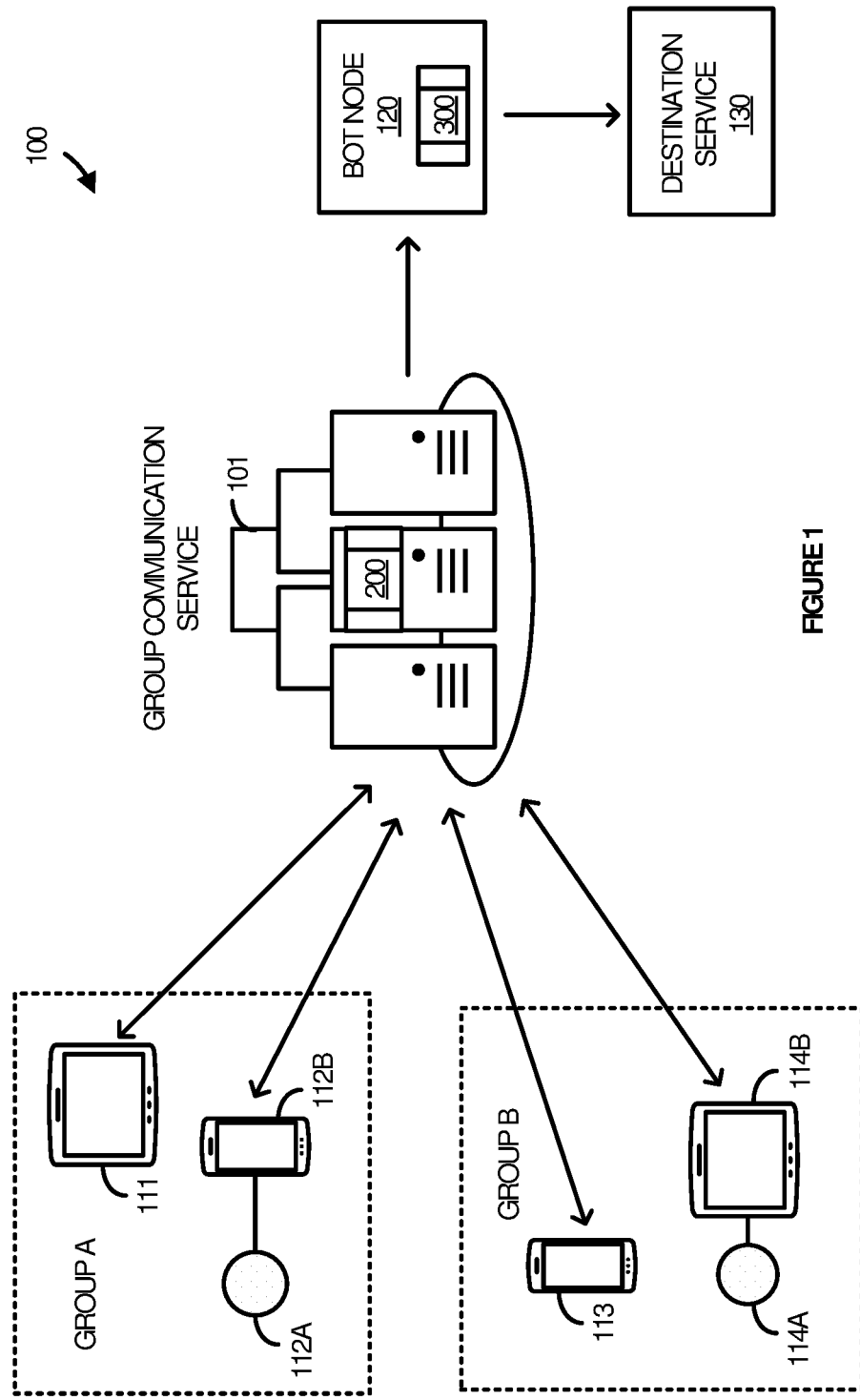
FIG. 1 illustrates an operational architecture for implementing embodiments of enhanced audio message transcriptions for destination services.
Figure 2:
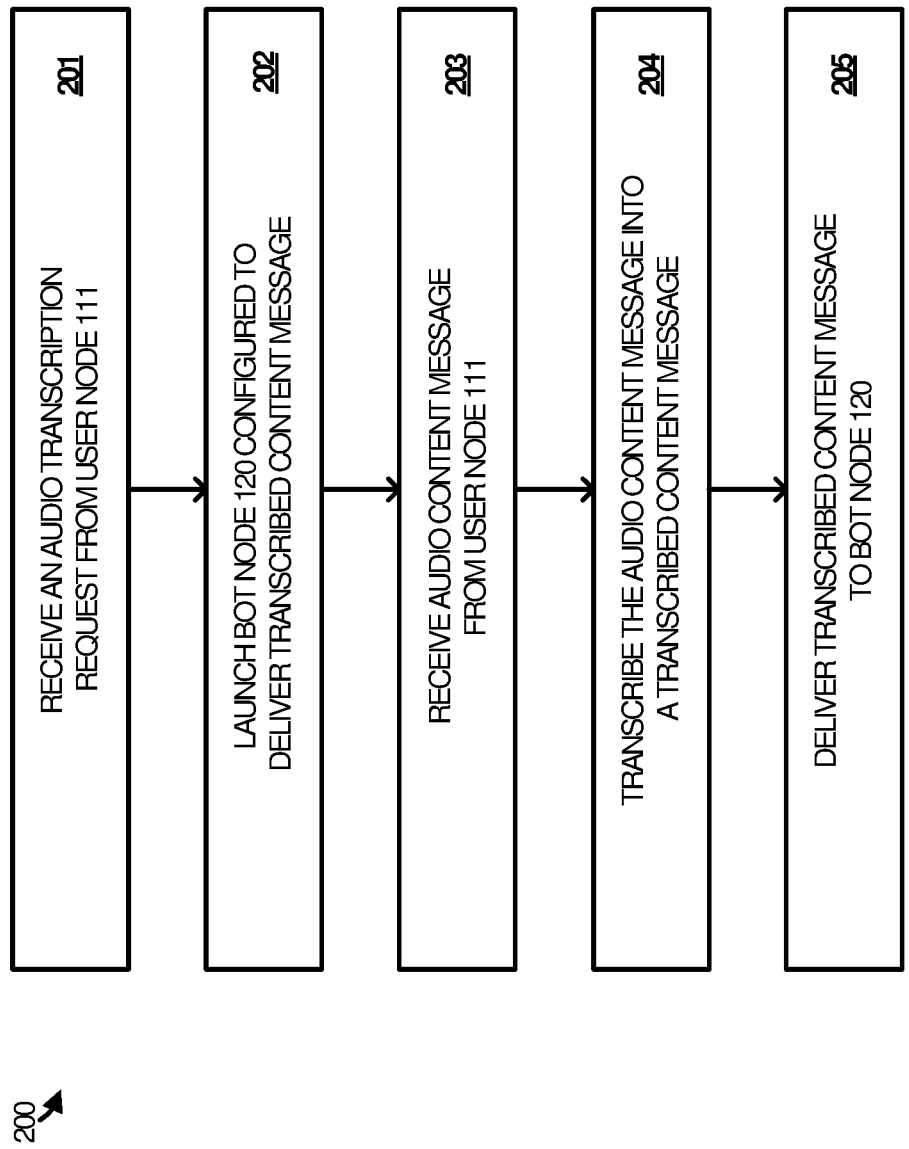
FIG. 2 illustrates a transcribing process employed by a group communication service in embodiments of enhanced audio message transcription to destination services.

FIG. 1 illustrates operational architecture 100 for implementing enhanced audio message transcription to destination services in an embodiment. Operational architecture 100 includes group communication service 101, member operated user nodes represented by user nodes 111-114, bot node member represented by bot node 120, and destination service represented by destination service 130. User nodes 111 and 112 are included in Group A where user node 112 includes end device 112A and intermediate device 112B. User nodes 113 and 114 are included in Group B where user node 114 includes end device 114A and intermediate device 114B. User nodes 111-114 are connected to group communication service 101 over a network. Group communication service 101 also includes a transcribing process 200, and bot node 120 includes a publishing processing 300.

In a brief example, the group communication service receives user node communications from and distributes user node communications to members of a communication group. The communication group member may comprise a plurality of user nodes. These may be, for instance, a group of emergency responders communicating about a natural disaster, a or any other type of organization that may be connected for group communications.

Figure 7:
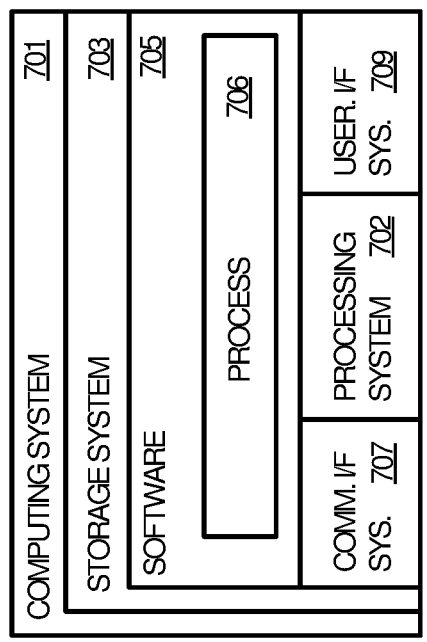
FIG. 7 illustrates a computing system suitable for implementing the group communication technology disclosed herein, including any of the architectures, processes, operational scenarios, and operational sequences illustrated in the Figures and discussed below in the Technical Disclosure.

The group communication service provides an organizational presence to distribute communications between user nodes in groups and external destination services. For example, members of a group may login to the group communication service to receive and transmit group communications. The group communication service may be implemented on one or more computing systems, of which computing system 700 in FIG. 7 is representative.

The user nodes are then associated with one or more communication groups and share communications through a group communication service that will be used to receive and distribute the communications to the group members. For example, user nodes 111-112 share group communications in Group A while user nodes 113-114 share group communications in Group B. The group communication service may be hosted in a public cloud environment, a private cloud environment, on-premises, via remotely deployable infrastructure, or in some other manner Examples of user nodes may include customized electronic end user device, such as end device 112A and 114A, (e.g., a wearable end user device that operates as a push-to-talk (PTT) device) that is communicatively linked to an intermediate communication device, such as intermediate device 112B and 114B, (e.g., a smartphone that receives communications from the end user device) using a link.

A given user node may become associated with a communication group during the setup and configuration process of the user nodes. The user nodes can be configured to allow a member of the group to audibly communicate with one or more members of a group and/or the group communication service without having to provide user input to an intermediate communication device, such as a mobile phone. The user nodes may be required to provide authentication and/or other information to link to their respective intermediate communication devices, after which a member can utilize a linked end user device to communicate directly with other members of a group.

With the user nodes distributing audio communications between one another within their associated communication groups, the group communication service may then receive a request or otherwise determine that an audio message needs to be transcribed and delivered to a destination service. The request may be received from one or more user nodes based on a member operating the user node interacting with the end-user device using a button, a key, a gesture, a voice command, and the like. The request may also be determined based on an instruction from an administrator or leader of the communication group.

Once the request to transcribe the audio message has been determined, the group communication service determines a bot node member associated with the communication group and that may be launched by the group communication service. The bot node will subsequently be used to deliver the transcribed message to a destination service. The destination service may be any external service that publishes content included in the transcribed message. In addition, the transcribed message may be delivered to the destination service by using the bot node member.

At this point, the group communication service may also receive the audio content from the user nodes in the form of an audio content message. The audio message may then be converted into the transcribed message using an internal or external transcriber. Audio content messages may be concerted by one or more transcription applications. Transcription applications convert audio data into a text format. The audio data may be received from a user node in the form of a live audio stream or an audio recording, such as a Moving Picture Experts Group (MPEG)-1 or MPEG-2 Audio Layer III (MP3) file, a Waveform Audio File Format (WAV) file, or some other audio coding format.

In some scenarios, an Internet Protocol (IP) address associated with the bot node member is determined based on an IP address associated with the user node member. In other scenarios, an IP address associated with the bot node member is determined based on an IP address associated a group identifier. In either scenario, the transcribed content message is delivered to the destination services using an IP address associated with the bot node member.

In some implementations, the group communication service receives a transcribed content message from the one or more destination services over the bot node member of the communication group. The group communication service then delivers an audio content message of the transcribed content message to the one or more of the plurality of user nodes in the communication group. In this example embodiment, the group communication service either converts the transcribed content message into the audio content message or uses an external transcriber, such as bot node 120, to convert the transcribed content message into an audio content message.

Group communication service 101 employs a transcribing process 200 in various implementations, to transcribe one or more audio content messages. Transcribing process 200 may be implemented in program instructions in the context of any of the software applications, modules, components, or other such program elements that comprise group communication service 101. The program instructions direct the underlying physical or virtual computing system or systems that provide group communication service 101 to operate as follows.

In operation, group communication service 101 receives an audio transcription request from one or more of user nodes 111-112 (step 201). The audio transcription request may be provided by one member of the group, multiple members in the communication group, or specific members in the group, such as an administrator or group leader. The audio transcription request may be received via a secure communication channel established between a user node and the group communication service. In some implementations, the user node may present a user interface through which the members of the group are able to initiate the audio transcription request, such as a button, key, gesture, voice command, or other initiation request.

In some implementations, the audio transcription request may include an instruction to deliver the transcribed content message to a specific destination service. In other examples, the audio transcription request may include an instruction to deliver the transcribed content message to any destination service associated with the communication group. In either case, the identity of user node 111 initiating the audio transcription request and its associated group is known by group communication service 101 and delivered to the destination services on behalf of user node 111 and the communication group.

The audio transcription request may include information that categorizes user node 111 to Group A, or to destination service 130. The information may be, for example, an IP address or a Media Access Control (MAC) address associated with user node 111. Alternatively, user node 111 may have been assigned an activation to group communication service 101, or at any other time. User node 111's identity may be known or readily accessible by the application running on user node 111. The identity of user node 111 allows group communication service 101 to determine bot node 120 or destination service 130 which user node 111 has subscribed to publish content on.

Next, group communication service 101 launches bot node 120 of the communication group configured to deliver transcribed content messages to one or more destination services (step 202). This may include, for example, providing bot node member 120 with instructions for locating and delivering the requested audio content to destination service 130. Group communication service 101 may determine an IP address associated with bot node 120 based on the IP address of user node 111. However, it should be noted that in some examples, group communication service 101 identifies the IP address of bot node 120 based on an association with the communication group, such as Group A, or the identity of the required destination service 130.

At this point, group communication service 101 has obtained the request to transcribe an audio content message for delivery to destination service 130 and launched bot node 120 to deliver the transcribed content message. Group communication service 101 then receives an audio content message (step 203). The audio content message may be received from user node 111 initiating the audio transcription request, or may be received from multiple user nodes 111-112 in the group. For example, a group leader may give the voice command to transfer the audio transcription request but group communication service 101 may receive all audio content from the various group members to put into a single audio message to be transcribed and published on behalf of the communication group.

In some implementations, group communication service 101 may continue to receive audio content from user node 111 or the communication group until a termination request for the audio transcription is activated, such as by a button, key, gesture, voice command, or other termination request technique. In other implementations, group communication service 101 may continue to receive audio content data until the duration of a timer has expired, until user nodes 111-112 are inactive for a duration of a timer, until an administrator or group leader deactivates the audio transcription request, or until some other deactivation technique by group communication service 101 is determined.

In a next operation, group communication service 101 transcribes the audio content message into a transcribed content message (step 204). The audio content message may be transcribed by group communication service 101 itself using an internal transcriber. In other examples, group communication service 101 may transfer the audio content message to bot node 120 to transcribe before publishing. In both implementations, either group communication service 101 or bot node 120 may transfer the audio content message to an external transcriber to transcribe the audio content message into the transcribed content message.

Group communication service 101 then delivers the transcribed content message to the one or more destination services over bot node 120 (step 205). In preparation for delivering the transcribed content message to destination service 130 over bot node 120, the identity associated with user node 111 and/or its communication group is translated into an identifier associated with bot node 120 which may then deliver the transcribed content message to destination service 130. In some implementations, the identifier may comprise an IP address, a MAC address, an application protocol identifier, and the like.

Figure 3:
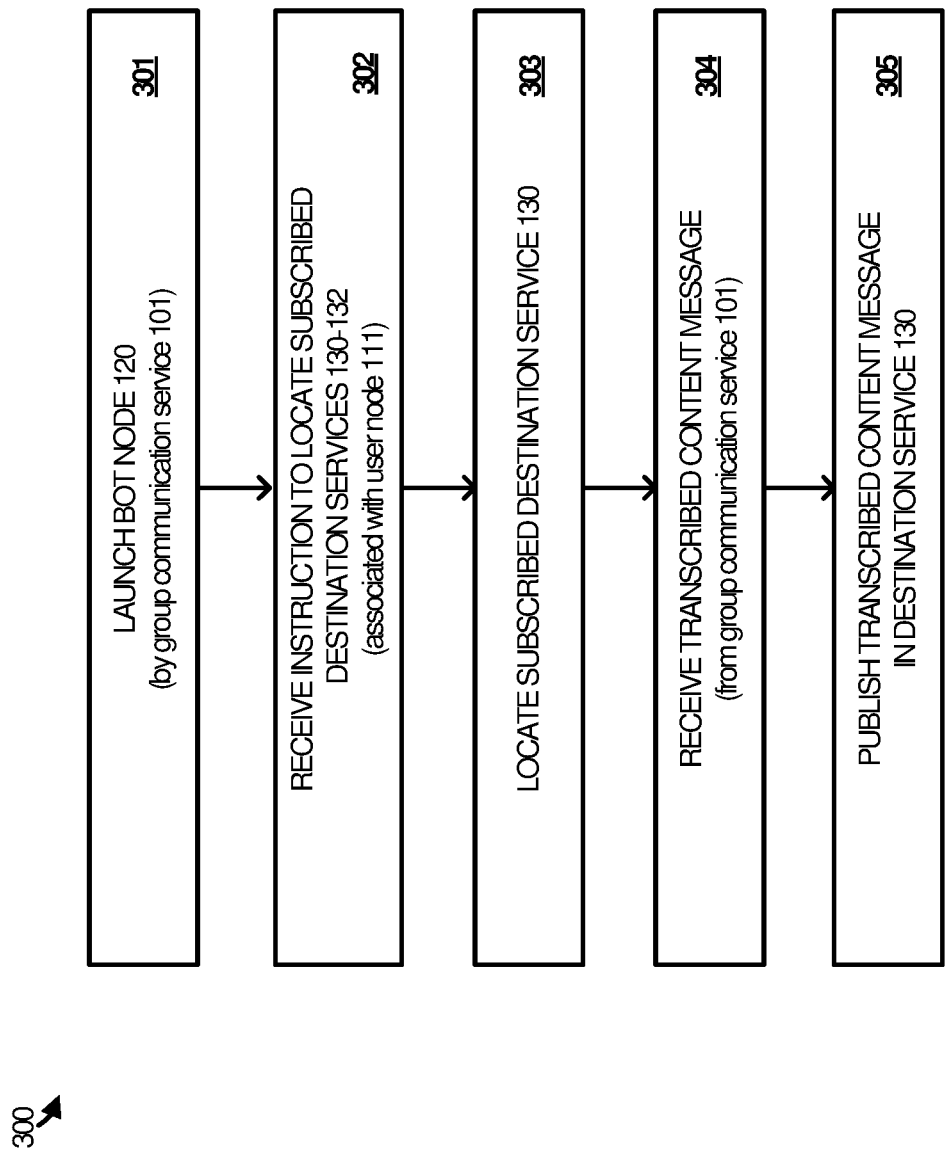
FIG. 3 illustrates a publishing process employed by a bot node in embodiments of enhanced audio message transcription to destination services.

Referring now to FIG. 3, bot node 120 employs publishing process 300 in various implementations, in the context of supporting the delivery of one or more transcribed content messages to destination services. Publishing process 300 may be implemented in program instructions in the context of any of the hardware, firmware, software applications, modules, components, or other such program elements that comprise each bot node. The program instructions direct bot node 120 to operate as follows.

In operation, a given bot node is launched to be used with respect to one or more transcription sessions, such as a post on a social media network, published information on a collaborative application platform, or any other collective communication outlet. As part of publishing process 300, bot node 120 is launched by group communication service 101 (step 301). Bot node 120 may be launched for a specific group of user nodes 111-112, or be launched on behalf of group communication service 101 or destination service 130.

Bot node 120 may receive instructions to locate required destination service 130 as determined by data stored in group communication service 101 associating the identity of user node 111 initiating the transcription request (step 302). Bot node 120 can be instantiated (physically and/or virtually) inside group communication service 101, instantiated (physically and/or virtually) inside destination service 130, or can be configured as a bot node in some other way. Bot node 120 locates the subscribed destination service 130 (step 303).

Bot node 120 then receives the transcribed content message from group communication service 101 (step 304). In some implementations, bot node 120 receives the audio content message instead of the transcribed content message. In this scenario, bot node 120 would then convert the audio content message into the transcription content message. It should be noted that the conversion may be done in bot node 120 itself, or in an external transcription service.

At this point in publishing process 300, bot node 120 delivers the transcribed content message to subscribed destination service 130 where the transcribed content message is published in association with user node 111 or the communication group associated with user node 111, such as Group A (step 305). For example, the content may be posted on a social media site, shared in a discussion forum, or recorded in a collaborative work application platform. The transcribed content message may be delivered unidirectionally (i.e., outcoming publications are only delivered to destination service 130).

In other examples, the transcribed content message may be delivered bidirectionally (i.e., outcoming publications are delivered to destination service 130 and incoming publications are received by bot node 120 from destination service 130). In this example, bot node 120 receives the transcribed content message from destination service 130 and transfers the transcribed content message to group communication service 101. Alternatively, bot node 120 may convert the received transcribed content message into an audio content message for delivery to group communication service 101.

Figure 4:
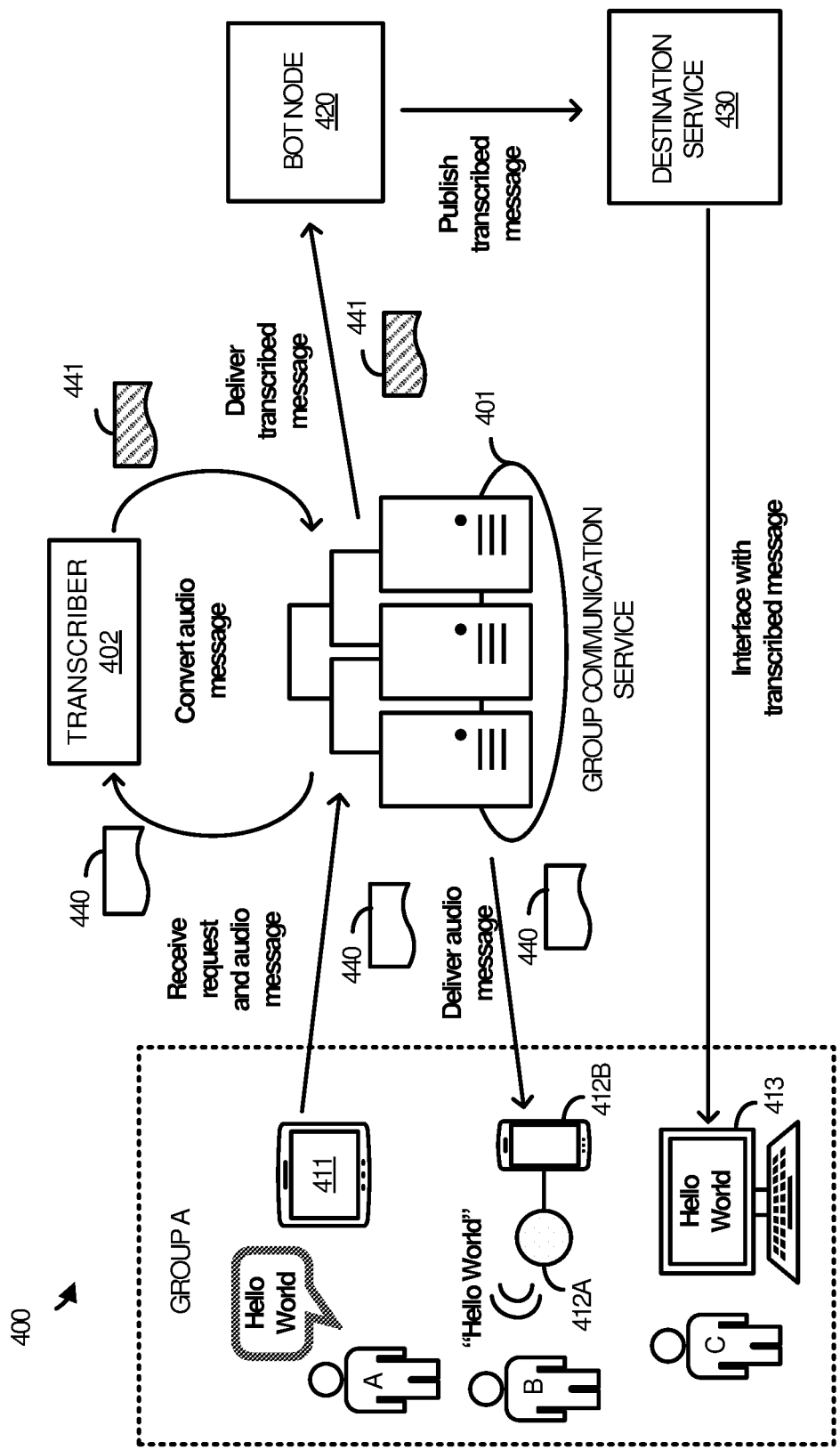
FIG. 4 illustrates an operational scenario in an embodiment of enhanced audio message transcription to destination services.

FIG. 4 illustrates an operational scenario that may occur with respect to the operational architecture illustrated in FIG. 1, as group communication service 401, user nodes 411-413 in Group A, and bot node 420 employ transcription process 200 and publishing process 300 respectively. FIG. 4 further includes audio content message 440 and transcribed content message 441.

In operation, user nodes 411-413 interface with group communication service 401 to setup a group communication session. The group communication session may be setup for member of a Group A using user nodes 411-413, for example, Emergency Medical Service (EMS) response personnel, judicial staff, law-enforcement and correction officers, or the like. The communications may be used to exchange information between members of Group A using an end-user mobile device, such as end device 412A, that may interact with an intermediate mobile device, such as smartphone 412B.

The members of the group may send audio messages directly to each other. However, the members of the group may also want to send transcribed messages to additional personnel, such as team members at another location or requiring text documents, or to an application designed to archive the transcribed messages for later use. In this example scenario, Group A is an EMS team. In operation, audio content message 440 is received from an EMS team member to be transcribed by group communication system 401 and delivered to an application interfacing with group members who may need to view the audio message in text format. For example, team members in one location may not be able to hear audio content message 440 due to loud noises and would need to read the message instead. Accordingly, group communication service 401 internally converts audio content message 440 into transcribed audio message 441 to be delivered to bot node 420 associated with the EMS team using transcriber 402.

Group communication service 401 sets up the group communications between members of the EMS team and receives user node communications from and distributing user node communications to members of the EMS team. Assuming the EMS team is called to an event, the EMS team members use user nodes 411-413 to exchange audio content messages. For example, the EMS team may arrive at a natural disaster and exchange initial observations between members of the EMS team using a wearable end user device that operates as a push-to-talk (PTT) device that is communicatively linked to a smartphone that receives communications from the PTT device using a link.

However, at some point the EMS team members may want to begin informing the other team members on conditions of a person that will be transported to the hospital. The EMS team may not want to provide all of the content being exchanged between the members, but only want to send content pertaining to a specific patient. Therefore, an EMS team member may use user node 411 to request a transcription of audio content message 440 and deliver transcribed content message 441 to an application interfacing with the other user nodes 412-413. The EMS team member may initiate that request using a button, key, gesture, voice command, or some other method of initiating the request.

Once group communication service 401 receives the audio transcription request from one or more of the plurality of user nodes, such as user node 411, group communication service 401 may correlate the user node ID and/or group ID to determine a bot node member associated with the user node ID and/or group ID, such as bot node 420. Group communication service 401 then launches bot node 420 for the EMS team configured to deliver transcribed content messages to one or more destination services, such as destination service 430 interfacing with user node 413. It should be noted that audio content message 440 may also be delivered to end device 412A over smartphone 412B. For example, audio content message 440 stating the "hello world" phrase is audibly played to the user of end device 412A over smartphone 412B. However, user node 413 will read a text version of the message from destination service 430.

As part of the transcribing process, group communication service 401 receives audio content message 440 from user node 411 saying "hello world." Although not shown, audio content message 440 may further indicate an initial condition of the person along with any other relevant information that may be useful to other EMS team member when interacting with the person. In this example embodiment, group communication service 401 interfaces with external transcriber 402 used to convert audio content message 440 into transcribed content message 441.

Group communication service 401 also determines a bot node member of the EMS team based on an internal database associating the IP address of user node and/or the communication group ID with an IP address of bot node 420. Group communication service 401 may also determine destination service 430 associated with group communication service 401. Group communication service 401 may then launch bot node 420 associated with destination service 430. Once bot node 420 has been determined and launched, and transcriber 402 has converted audio content message 440 into transcribed content message 441, group communication service 401 may transfer transcribed content message 441 to bot node 420 to deliver to destination service 430 interfacing with user node 413 as determined by group communication service 401.

Figure 5:
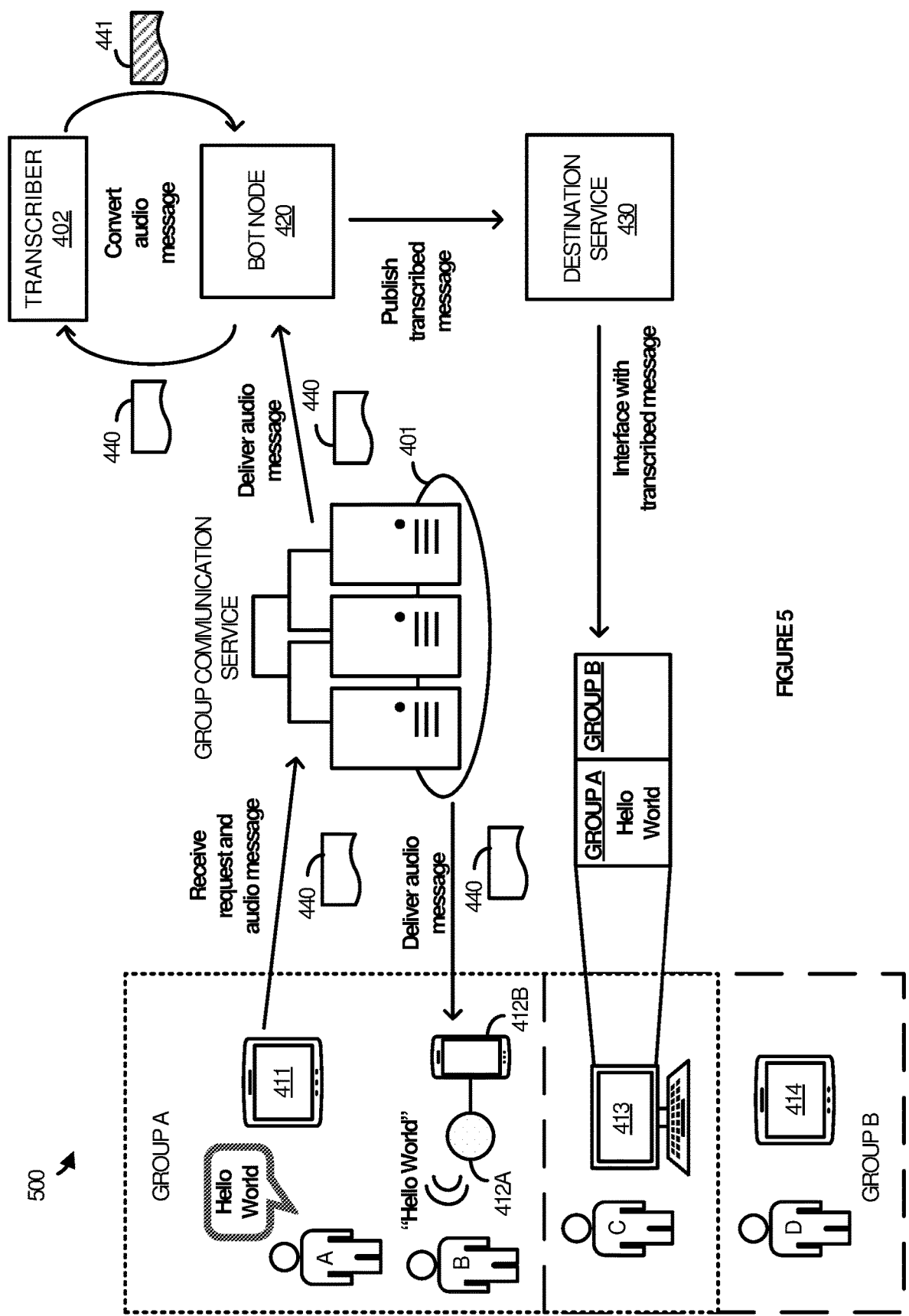
FIG. 5 illustrates an alternative operational scenario in an embodiment of enhanced audio message transcription to destination services.

FIG. 5 illustrates an alternative operational scenario that may occur with respect to the operational architecture illustrated in FIG. 1, as group communication service 401, user nodes 411-414, and bot node 420 employ transcription process 200 and publishing process 300 respectively. As shown in FIG. 5, Group A comprises user nodes 411-413 and Group B comprises user nodes 413 and 414. Therefore, user node 413 is a member of both Group A and Group B. FIG. 5 further includes audio content message 440 and transcribed content message 441.

In operation, user nodes 411-414 interface with group communication service 401 to setup a group communication session. The group communication session may be setup for members of the groups to communication using user nodes 411-414. For example, a group communication session may be setup for user nodes 411-413 in Group A to exchange communications and another group communication session may be setup for user nodes 413-414 in Group B to exchange communications. The communications may be used to exchange information between members of the groups using an end-user mobile device that may interact with an intermediate mobile device, such as a smartphone. For example, Group A may be setup for a law-enforcement team while Group B may be setup for a fire department team. User node 413 may be setup to receive communications on both teams. Therefore, user node 413 may publish data in separate destination services depending on the communication group user node 413 is participating in.

In this example scenario, audio content message 440 is received from a law-enforcement staff member to be transcribed by group communication system 401 and delivered to an application used to archive the messages for later use, such as in courtroom proceedings which may rely on the archived records. Accordingly, group communication service 401 delivers audio content message 440 to bot node 420 associated with the law-enforcement team.

Group communication service 401 sets up the group communications between members of the law-enforcement team and receives user node communications from and distributes user node communications to members of the law-enforcement team. Assuming the law-enforcement team is in a law-enforcement proceeding, the law-enforcement staff members use user nodes 411-413 to exchange audio content messages. For example, the law-enforcement officers in the field may communicate with each other regarding a 911 call.

However, at some point the law-enforcement team members may want to begin documenting and archiving their observations and/or actions taken in response to the 911 call. The law-enforcement team may not want to provide all of the content being exchanged between the members, but only want to send content pertaining to a specific 911 call. Therefore, a law-enforcement team member may use user node 411 to request a transcription of audio content message 440 and deliver transcribed audio content message 441 to an application interfacing with the police station associated with the law-enforcement team. The law-enforcement team member may initiate that request using a button, key, gesture, voice command, or some other method of initiating the request.

Once group communication service 401 receives the audio transcription request from one or more of the plurality of user nodes, such as user node 411, group communication service may correlate a MAC address of user node 411 and the law-enforcement team ID to determine bot node 420 associated with user node 411 and the law-enforcement team. It should be noted that both the user node ID and the group ID are required to determine the associated bot node. Group communication service 401 then launches bot node 420 of the communication group configured to deliver transcribed content messages to one or more destination services, such as destination service 430 interfacing with police station staff 412-413. It should be noted that audio content message 440 may also be delivered to end device 412A over smartphone 412B. For example, audio content message 440 stating the "hello world" phrase is audibly played to the user of end device 412A over smartphone 412B. However, user node 413 will read a text version of the message from destination service 430.

As part of the transcribing process, group communication service 401 receives audio content message 440 from user node 411, such as "hello world." Although not shown, audio content message 440 may indicate initial observations made by officers at the scene of the crime. In this example embodiment, group communication service 401 does not include an internal transcriber or interact with an external transcriber. However, bot node 420 may interface with external transcriber 402 to securely convert audio content message 440 into transcribed content message 441.

Group communication service 401 determines bot node 420 of the law-enforcement team based on an internal database associating the MAC address of user node 411 and/or the law-enforcement team ID with a bot node member ID, such as bot node 420. Group communication service 401 may also determine destination service 430 associated with group communication service 401. Group communication service 401 may then launch bot node 420.

Once bot node 420 has been determined and launched, group communication service 401 may transfer audio content message 440 to bot node 420. Bot node 420 then delivers audio content message 440 to external transcriber 402 which converts audio content message 440 into transcribed content message 441. Bot node 420 then receives transcribed content message 441 from external transcriber 402 and delivers transcribed content message 441 to destination service 430 interfacing with the police station staff user node 413 as determined by group communication service 401. As illustrated in FIG. 5, user node 413 may read messages from both Group A and Group B over destination service 430. In this example, destination service 430 has published transcribed content message 441 in the Group A communication forum.

Figure 6:
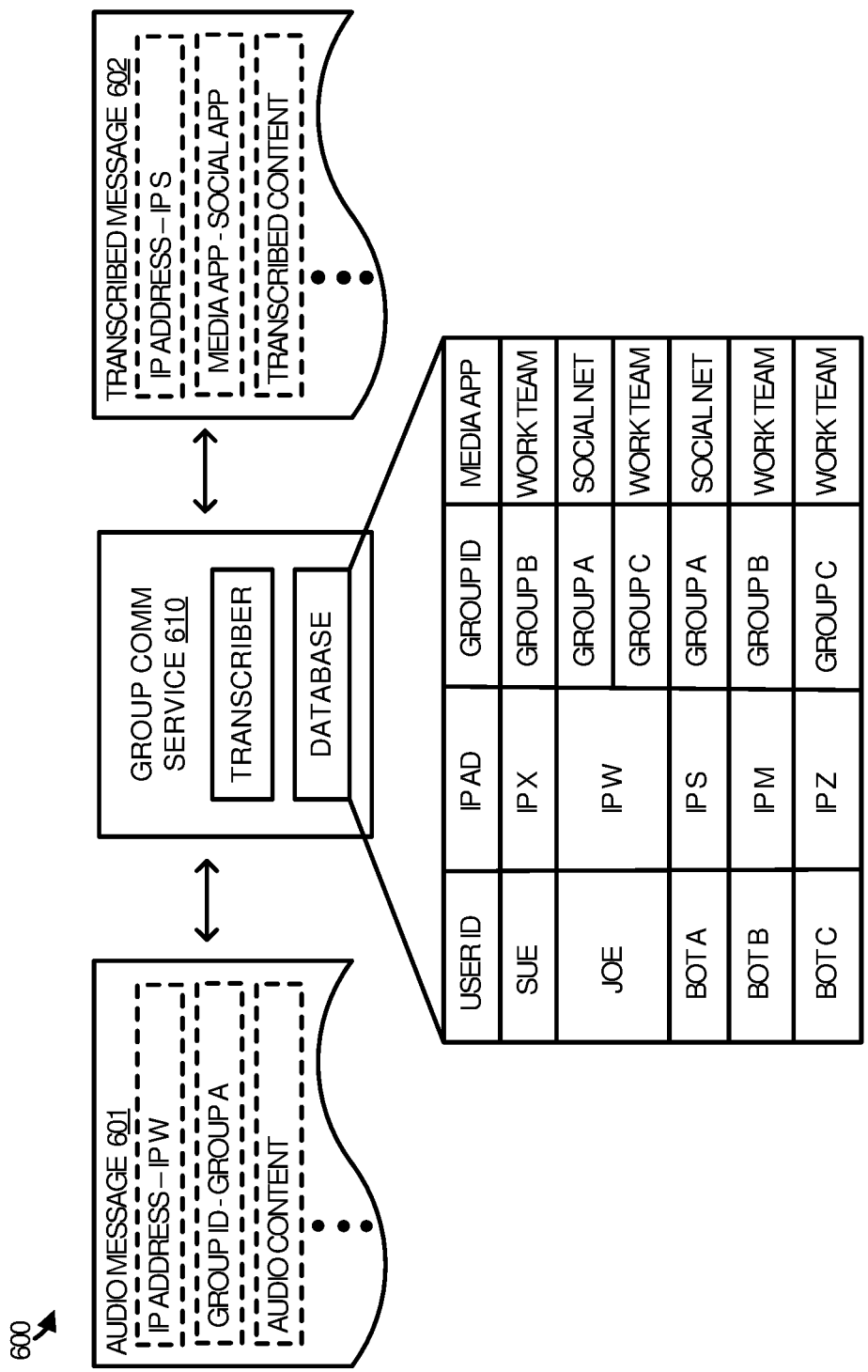
FIG. 6 illustrates an operational architecture in an embodiment of enhanced audio message transcription to destination services.

Referring to FIG. 6, an operational architecture is represented. FIG. 6 includes audio content message 601, group communication service 610, and transcribed content message 602. In this example embodiment, audio content message 601 includes a user identity field, a group identity field, and audio content. Transcribed content message 602 includes an IP address field, a destination service identity field, and transcribed content. It should be noted that although the conversion from audio content message 601 to transcribed content message 602 is performed by group communication service 610, the conversion may also be done by other components, such as a bot node or another service external from the group communication system.

In addition to the internal transcriber to convert audio content in audio content message 601 into transcribed content in transcribed content message 602, group communication service 610 also includes an internal database. As demonstrated in FIG. 6, the database associates a user identity with an IP address, a group identity, and a destination service application. For example, the user identity of Joe is associated with an IP address of IP W, a group identity of Group A, and destination service application identified as Social Network.

When group communication service 610 receives audio content message 601, assuming group communication service 610 has previously received a request to transcribe and deliver an audio message from the user node associated with the user identity of Joe, group communication service 601 determines an associated bot node to launch and instruct to deliver transcribed content message 602 to the required destination services. For example, group communication service 610 may extract information from the IP address field, IP W, and the group identity field, Group A, and determine that IP W and Group A are associated with Bot A and the Social Network media service. At any point, group communication service 610 also extracts the audio content from audio content message 601 and converts the audio content into transcribed content using the internal transcriber.

Once group communication service 610 converts the audio content into the transcribed content and determines that Bot A is associated with Joe using IP address IP W from group A, group communication service 610 launches Bot A and generates the transcribed content message 602 by inserting the IP address of IP S associated with Bot A, the destination media service of Social Network, and the transcribed content. Generated transcribed content message 602 is then transferred from group communication service 610 to Bot A to locate the Social Network media service and publish transcribed message 602 in the Social Network media service.

FIG. 7 illustrates computing system 701, which is representative of any system or collection of systems in which the various applications, services, scenarios, and processes disclosed herein may be implemented. Examples of computing system 701 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709 (optional).

Processing system 702 loads and executes software 705 from storage system 703. Software 705 includes process 706, which is representative of the processes discussed with respect to the preceding FIGS. 1-6, including transcribing process 200 and publishing process 300. When executed by processing system 702 to enhance audio message transcription to destination services, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, graphical processing unites, application specific processors, and logic devices, as well as any other type of processing device, combination, or variation.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for implementing transcribing process 200 and publishing process 300.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include process 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system to enhance audio message transcription to destination services. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here.

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), HTTPS, REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method of operating a group communication service, the method comprising:
   receiving user node communications from and distributing user node communications to members of a communication group, wherein the communication group members comprise a plurality of user nodes;
   receiving an audio transcription request from one or more of the plurality of user nodes;
   launching a bot node member of the communication group configured to deliver transcribed content messages to one or more destination services, wherein an Internet Protocol (IP) address associated with the bot node member is determined based on one or more IP addresses associated with the one or more of the plurality of the user nodes;
   receiving an audio content message from the one or more of the plurality of user nodes; and
   delivering a transcribed content message of the audio content message to the one or more destination services over the bot node member of the communication group, wherein the transcribed content message is delivered to the one or more destination services using an IP address associated with the bot node member.

2. The method of claim 1 wherein the group communication service converts the audio content message from the one or more of the plurality of user nodes into the transcribed content message.

3. The method of claim 1 wherein the bot node member converts the audio content message from the one or more of the plurality of user nodes into the transcribed content message.

4. The method of claim 1 wherein the one or more destination services are determined based on associations with at least one of an identifier associated with the one or more of the plurality of the user nodes and an identifier associated with the communication group.

5. The method of claim 1 wherein the audio transcription request received from the one or more of the plurality of user nodes comprises a voice command recorded from the one or more of the plurality of user nodes.

6. The method of claim 1 further comprising:
   receiving a transcribed content message from the one or more destination services over the bot node member of the communication group; and
   delivering an audio content message of the transcribed content message to the one or more of the plurality of user nodes in the communication group.

7. The method of claim 6 further comprising converting the transcribed content message from the one or more destination services into the audio content message, wherein the audio content message is a spoken message.

8. A computing apparatus comprising:
   one or more computer readable storage media;

a processing system operatively coupled with the one or more computer readable storage media; and program instructions for supporting group communication services stored on the one or more computer readable storage media that, when executed by the processing system, direct the processing system to at least:

receive user node communications from and distribute user node communications to members of a communication group, wherein the communication group members comprise a plurality of user nodes;

receive an audio transcription request from one or more of the plurality of user nodes;

launch a bot node member of the communication group configured to deliver transcribed content messages to one or more destination services, wherein an Internet Protocol (IP) address associated with the bot node member is determined based on one or more IP addresses associated with the one or more of the plurality of user nodes;

receive an audio content message from the one or more of the plurality of user nodes; and deliver a transcribed content message of the audio content message to the one or more destination services over the bot node member of the communication group using an IP address associated with the bot node member.

9. The computing apparatus of claim 8 wherein the group communication service converts the audio content message from the one or more of the plurality of user nodes into the transcribed content message.

10. The computing apparatus of claim 8 wherein the bot node member converts the audio content message from the one or more of the plurality of user nodes into the transcribed content message.

11. The computing apparatus of claim 8 wherein the one or more destination services are determined based on associations with at least one of an identifier associated with the one or more of the plurality of the user nodes and an identifier associated with the communication group.

12. The computing apparatus of claim 8 wherein the audio transcription request received from the one or more of the plurality of user nodes comprises a voice command recorded from the one or more of the plurality of user nodes.

13. The computing apparatus of claim 8 further configured to:

receive a transcribed content message from the one or more destination services over the bot node member of the communication group; and deliver an audio content message of the transcribed content message to the one or more of the plurality of user nodes in the communication group.

14. The computing apparatus of claim 13 further configured to convert the transcribed content message from the one or more destination services into the audio content message, wherein the audio content message is a spoken message.

15. A method of operating a group communication system, the method comprising:

receiving user node communications from and distributing user node communications to members of a communication group, wherein the communication group members comprise a plurality of user nodes;

receiving an audio transcription request from one or more of the plurality of user nodes;

launching a bot node member of the communication group configured to deliver transcribed content messages to one or more destination services, wherein an Internet Protocol (IP) address associated with the bot node member is determined based on one or more IP addresses associated with the one or more of the plurality of user nodes;

receiving an audio content message from one or more of the plurality of user nodes;

converting the audio content message from the one or more of the plurality of user nodes into a transcribed content message; and delivering the transcribed content message of the audio content message to the one or more destination services over the bot node member of the communication group using an IP address associated with the bot node member.

16. The method of claim 15 wherein the one or more destination services are determined based on associations with at least one of an identifier associated with the one or more of the plurality of the user nodes and an identifier associated with the communication group.

17. The method of claim 15 wherein the audio transcription request received from the one or more of the plurality of user nodes comprises a voice command recorded from the one or more of the plurality of user nodes.

18. The method of claim 15 further comprising:

receiving a transcribed content message from the one or more destination services over the bot node member of the communication group;

converting the transcribed content message from the one or more destination services over the bot node member of the communication group into an audio content message; and delivering the audio content message of the transcribed content message to the one or more of the plurality of user nodes in the communication group.

19. The method of claim 18 further comprising delivering the audio content message to all user nodes in the communication group.

* * * * *